United States Patent [19]
Young

[11] Patent Number: 5,382,834
[45] Date of Patent: Jan. 17, 1995

[54] ELECTRICAL TRANSIT POWER SUPPLY SYSTEM

[75] Inventor: Thomas A. Young, Mount Olive, N.C.

[73] Assignee: Impulse NC, Inc., Mount Olive, N.C.

[21] Appl. No.: 27,367

[22] Filed: Mar. 8, 1993

[51] Int. Cl.$^6$ .............................................. H02J 7/34
[52] U.S. Cl. ...................... 307/9.1; 307/45; 307/69
[58] Field of Search ............ 307/18, 19, 21, 22, 307/45, 46, 48, 49, 82, 69, 65, 71, 80

[56] References Cited

U.S. PATENT DOCUMENTS

| | | | |
|---|---|---|---|
| 1,227,772 | 5/1917 | Fortescue | 307/69 |
| 3,835,334 | 9/1974 | Notteau | 307/69 |
| 4,413,220 | 11/1983 | Waineo | 307/18 |
| 4,468,572 | 8/1984 | Miura et al. | 307/69 |
| 5,121,046 | 6/1992 | McCullough | 307/71 |

Primary Examiner—Jeffrey A. Gaffin
Assistant Examiner—Peter Ganjoo
Attorney, Agent, or Firm—Olive & Olive

[57] ABSTRACT

The power supply system for a DC powered electrical transit system is adapted to accommodate normal, surge and continuous peak demands by locating battery equipped secondary power supplies at locations which create excess power demands such as at passenger stations, at the beginning of an uphill grade and at midpoints between the primary power supplies. During normal operation, the batteries are charged and during surge or peak demand periods, are discharged to provide additional power to the system.

15 Claims, 4 Drawing Sheets

ELECTRICAL TRANSIT POWER SUPPLY SYSTEM

BACKGROUND OF THE INVENTION

1. Field of the Invention

This invention relates to a system of direct current power supplies for an electrical transit system employing electrically powered vehicles for transportation and, more particularly, to a system of power supplies for an electrical transit system which is capable of handling normal demand, surge demand, and continuous peak demand power requirements.

2. Description of Prior Art

An electrical transit power supply system is generally comprised of several interconnected direct current power supplies which are dispersed throughout the service area. A network of either rails or overhead cables is energized by the dispersed power supplies and the rails or cables are used as feeding lines to transfer the power to electrically energized vehicles. A system for supplying power to the feeding lines must overcome several problems. First, due to the distances involved, consideration must be given to overcoming the large voltage drops and losses incurred due to the resistance of the feeding lines. Generally, the mid-distance point between the two farthest apart power supplies is the point of highest impedance. Therefore, the highest loss and voltage drop occurs at this mid-point and effectively dictates the design of the entire system. Second, the system has to be responsive to three distinct power requirements of different characteristic, namely: normal demand, surge demand, and continuous peak demand.

Normal demand is the normal load created by a fixed number of vehicles during normal operation after start-up and on a substantially level grade. It is generally of a fairly constant amperage. Surge demand is created each time a vehicle starts its motion from rest and develops momentum. Such surge demand may generally last for several seconds or tens of seconds during which the system's voltage drops dramatically, especially at locations remote from the primary power supplies. A similar load and surge demand will be developed when a vehicle negotiates an up grade. Continuous peak demand is associated with transportation systems in which additional vehicles are added to the system during "rush hour." Such continuous peak demand may last up to several hours at a time. Since either of the above mentioned demands may occur at any point along the transit system where a vehicle is located, the power supply system must be able to deliver the required power at any point along the transit system. These factors dictate that the power supplies themselves, both in size and power output, and the distribution conductors be as much as four times the size that would be required for meeting a normal demand exclusively.

In order to minimize the losses associated with the resistance of the cables or rails, separate direct current power supplies are usually spaced apart throughout the length of the system and at a distance typically no more than two miles apart. In addition, in order to minimize the losses and voltage drops which may occur in the conductors extending between the power supplies, some systems utilize large conductors in an overhead catenary configuration or a "third" power rail. In situations where the size of the primary feeding line is limited by aesthetic or other practical considerations, a "parallel feeding line" is employed.

The parallel feeding line is typically buried in the earth and is a large diameter line of much lower resistance than the primary feeding line. Consequently, a large amount of power may be transmitted by the parallel line without significant loss. This parallel line is connected to the primary line every block or so, thereby reducing the need for power being fed through the primary line. The installation of a parallel feeding line generally involves the largest amount of civil work, disruption, and the longest time element. It entails digging of a large trench for the entire length of the transit system along which the parallel feeding line is buried. Another problem encountered with transit power supply systems designed according to the prior art is the power supplies interference with other users of the utility line. The surge demands and continuous peak demands significantly strain the capability of a utility power line. Such demands interfere with other users, which problem intensifies in a densely populated area where, in order to avoid power disturbances to residents, a dedicated utility line may be needed. Furthermore, because the transit power systems of the prior art satisfy the severe demand by drawing on the utility power, utility demand charges become a material part of the operational cost of the transit systems. Large, high capability generative devices are typically required in the prior art power supply systems.

SUMMARY OF THE INVENTION

The electrical transit power supply system of the invention alleviates the need for either a parallel feeding line or a dedicated utility line, and provides a system capable of handling normal, surge, and continuous peak demands. According to the invention, primary direct current power supplies, capable of handling normal demand, are dispersed throughout the entire system at distances significantly greater than in the systems of the prior art. Secondary direct current power supplies, comprising batteries and related circuitry arranged to provide a voltage which is equal or near that of the primary power supplies—any difference in voltage being dependent on the embodiment chosen—are dispersed between the primary power supplies, preferably at strategic locations where surge loads may occur and/or where the system's impedance is highest. Such locations would be, for example, passenger stations, the beginning of an upward grade and locations coinciding with the mid-distance between any two spaced apart primary power supplies or the like, where a booster power supply might be required.

Since according to the invention the primary direct current power supplies are designed to handle only normal demand, their physical size and power output may be appreciably smaller than those of the primary power supplies used in the prior art. Moreover, the power requirement from the utility lines for powering the invention system is smaller and therefore the need for a dedicated utility line is eliminated and utility high demand charges are avoided.

Each secondary power supply utilizes a battery bank and a DC to DC converter having a controllable output voltage connected in a manner which allows operation at two modes, charge and discharge. During normal operation and non-operation (such as at night) of the transit system the converter operates in a charge mode, and allows power to be controllably diverted from the feeding lines into the secondary power supply. This allows charging of the batteries of the secondary power supply to selected voltages at selected times. During surge or continuous peak demand the secondary power supply operates in a discharge mode and allows current to flow from the battery bank to the feeding lines, thereby providing additional power for the system without imposing a high power requirement on the converter. The switching between charge and discharge modes of the secondary power supply can be done either by detection of the load on the feeding lines, this being the preferred method for handling surge demand, or by timed or manual switching, manual switching being the method preferred for handling continuous peak demand.

The advantages of the power supply system of the invention can be further demonstrated by referring to the following example which employs illustrative values. In a system having a battery bank terminal voltage of 600 volts, a DC to DC converter may be employed to draw power from the primary source at a 600 volt, 1 ampere level resulting in a 600 watt power drain. Neglecting efficiency losses, the converter can then be used to convert the 600 watts of power to 60 volts at 10 amperes which is connected in series with the 600 volt supply to charge the battery, thereby providing 6600 watts of charging power. The 6600 watts comprises 6000 watts (600 volts × 10 amperes) from the supply and 600 watts (60 volts × 10 amperes) contributed by the DC to DC converter. A battery bank forming part of the invention system and which is fully charged at 660 volts thus has a substantially large discharge capacity in response to a surge demand, thereby eliminating the need for a large primary power source and the need for relatively large distribution conductors.

Although some existing electrical transit power supply systems utilize a battery bank, the configurations employed by those systems do not reduce the losses incurred by the feeding fines. In a typical prior art system, the battery bank is located at the location of the primary power supply and the battery power is conducted through the entire length of the feeding lines, thereby incurring losses. In addition, such systems may be distinguished from the electrical transit power supply system of this invention in that the battery bank of the prior art system is connected at the AC rather than at the DC side of the system. Moreover, these systems utilize the battery bank as a load shifting mechanism rather than as a booster system.

The present invention provides an electrical transit power supply system capable of supplying adequate power to an electrical transit system for an efficient and uniform operation regardless of the power requirement of the transit system.

It is therefore an advantage of the invention system that it provides for an arrangement of power supplies for an electrical transit system which is capable of handling normal, surge, and continuous peak demands.

Another advantage of the invention system is that it provides an arrangement of power supplies for an electrical transit system which reduces the losses incurred in the lines used for transmitting power to the electrically powered vehicles.

Yet another advantage of the invention system is that it provides an arrangement of power supplies for an electrical transit system which eliminates the need for a dedicated utility power fine.

A further advantage of the invention system is that it significantly reduces the utility high demand charges, thereby reducing the operational costs of an electrically powered transit system.

Another advantage of the system of the invention is that it provides for handling of high surge currents by a passive device, e.g. a diode or SCR, thereby reducing the need for large, high capability active devices.

Another advantage of the invention system is that it provides an inexpensive and efficient means for storing and releasing regenerative and braking energy.

Other objects and advantages will be more fully apparent from the following disclosure and appended claims.

DETAILED DESCRIPTION OF THE INVENTION

Figure 1:
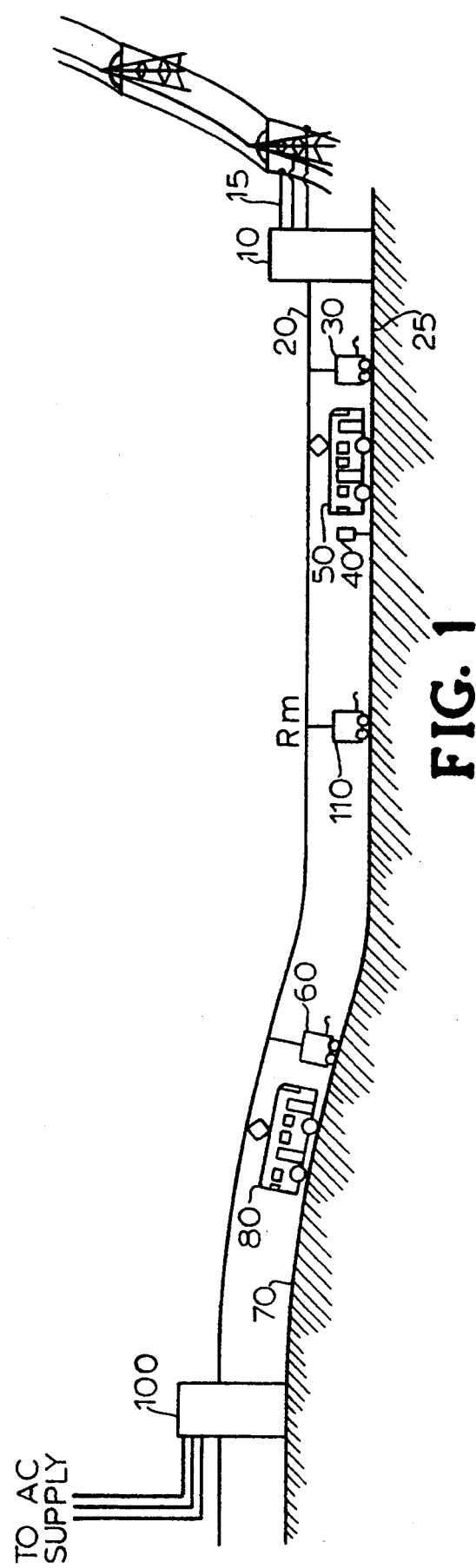
FIG. 1 illustrates a typical segment of an electrically powered transit system equipped with secondary power supplies according to the invention.

Making reference initially to FIG. 1, there is shown a segment of a typical electrically powered transit system arranged according to the invention. The illustrated primary power supplies 10 and 100 are capable of providing power sufficient for handling a normal load. Primary power supplies 10 and 100 are generally rectifiers which convert the alternating input current from the utility power line 15 into a direct current output which is fed to positive feeding line 20 and negative feeding line 25 which in the illustrated example constitutes an overhead cable and a rail or pair of rails. While not shown, the invention recognizes that primary power supplies 10 and 100 could comprise controllable DC power supplies.

Secondary power supply 30, utilized as a booster power supply, is shown in FIG. 1 located at passenger station 40. Secondary power supply 30 is connected to feeding lines 20 and 25 and provides the additional power necessary to handle surge demand. Such surge demand is created each time representative vehicle 50 starts to drive from rest. Another secondary power supply 60 is shown located at inclined slope 70. Secondary power supply 60 provides the additional power necessary to handle surge demand created each time representative vehicle 80 is driving up slope 70. Secondary power supply 110 is shown at a location marked Rm which is the mid-distance between primary power supplies 10 and 100, which location is the point of maximum impedance. During rush hour, when additional vehicles are added to the transportation system and continuous peak demand is created, secondary power sources 30, 60 and 100, are typically left connected in the discharge made for the entire duration, and resume normal operation after the additional vehicles are removed from the system. For ease of maintenance and replacement, secondary power sources 30, 60 and 110, may be fitted with wheels, illustrated as rail engaging wheels, and a tow hitch as indicated in FIG. 1.

Although hereinafter the secondary power supply of the invention is described as located between two primary power supplies, other uses are envisioned. For example, in an existing electrically powered transit system where an additional link is to be added in order to lengthen the service route, such link can be constructed according to the system shown in FIG. 1. In such a case primary power supply 10 could become the last primary power supply of the existing system. The additional link may be built depending on demand with or without adding another primary power source such as primary power source 100, although the presence or absence of another primary power source will dictate the location of point Rm.

Figure 2:
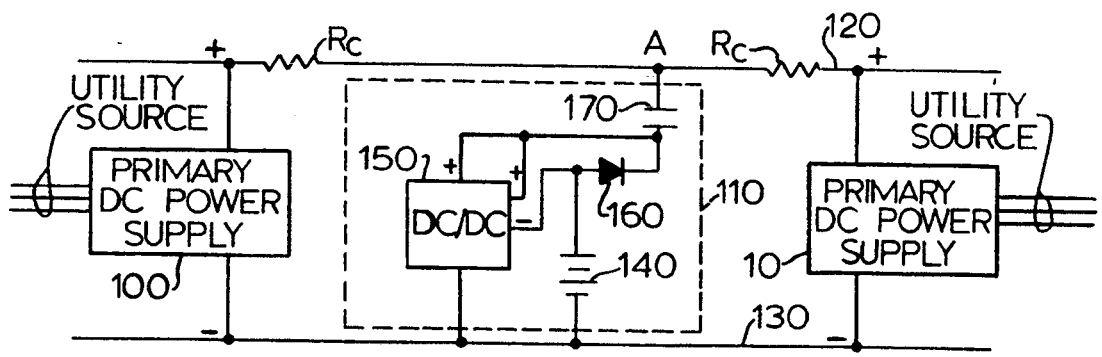
FIG. 2 illustrates a first preferred embodiment according to the invention of a secondary power supply useful as a secondary direct current power source responsive to surge demand.

Reference is next made to FIG. 2 and the representative first embodiment secondary power supply or booster power supply 110 of FIG. 1 is shown in dashed lines in FIG. 2. The illustrated transit system is assumed to use power rectifiers as the primary power supplies, two of which, primary power supplies 10 and 100 of FIG. 1 are shown in FIG. 2. The power rectifiers as shown in FIG. 2 energize positive feeding line 120 and negative feeding line 130. The resistances associated with feeding lines 120 and 130 are marked as resistors Rc. Secondary power supply 110 includes a battery bank 140. The negative terminal of battery bank 140 is connected to negative feeding line 130, and the positive terminal of battery bank 140 is connected to positive feeding line 120 through a diode 160 followed by a breaker 170. The location where is connected to positive feeding line 120 is marked as point A to indicate the location where for the purposes of demonstrating the invention, the potential of positive feeding line 120 is measured. The positive terminal of battery bank 140 is also connected to the negative low voltage terminal of a DC to DC converter 150 having a controllable voltage ratio and forming part of the secondary power supply 110. Such controllers referred to as switching power supplies are available and typically provide the voltage control function by varying the duty cycle. The positive low voltage terminal of converter 150 is connected to positive feeding line 120 through breaker 170. The positive high voltage terminal of converter 150 is connected to feeding line 120 through breaker 170 and the negative high voltage terminal Of converter 150 is connected to feeding line 130. As shown in FIG. 2 and in each of the later described secondary power supply embodiments, a converter 150 is provided at the same physical location as that of a battery bank 140 for each secondary power supply.

Battery bank 140 is designed to provides a terminal voltage which is lower than the no-load DC voltage of the supply system, but higher than the nominal DC voltage of the system under load as measured at the location of the battery bank. Typical values are 650 volts no-load system voltage, 600 volts nominal system voltage, and 620 volts battery terminal voltage. During low load, converter 150 acts as a controller and regulates the charging of battery bank 140 by providing a controllable voltage drop between feeding line 120 and battery bank 140 and conserving energy by converting voltage and producing current flow into the feeding line. During surge demand, the system's voltage drops below the battery bank 140 voltage and diode 160 allows current to flow directly from battery bank 140 to the transit system and bypasses converter 150. Battery bank 140, converter 150, and diode 160 are electrically protected by breaker 170.

Figure 3:
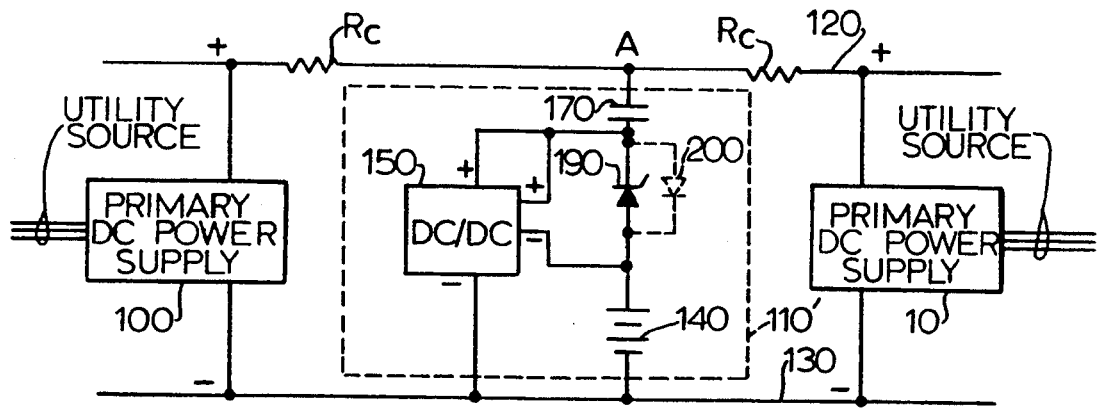
FIG. 3 illustrates a second embodiment of a secondary power supply which allows storage of regenerative energy as, for example, braking energy in a transit system.

Reference is next made to FIG. 3 and a second embodiment secondary power booster supply illustrated in dashed lines 110' and incorporating an SCR or thyristor 190 and diode 200 connected as shown. In this embodiment, battery bank 140 has a slightly higher terminal voltage than the no-load system voltage. A typical value of the battery bank terminal voltage for battery bank 140 for a no-load system voltage of 650 volts would be 670 volts. During low load., converter 150 boosts the system's voltage for the purpose of charging battery bank 140 by converting the high voltage at its input terminals to a low voltage which is added to the system voltage. SCR 190 may be triggered to allow flow of current from battery bank 140 to the system by the voltage of the system, or may be turned on by a trigger circuit or by a timer for the purpose of providing continuous flow of current from battery bank 140 during continuous peak demand. Diode 200 is used to control the passage of regenerative current for storage of excess power in battery bank 140. SCR 190 can be commutated by converter 150 or by opening of breaker 170.

Figure 4:
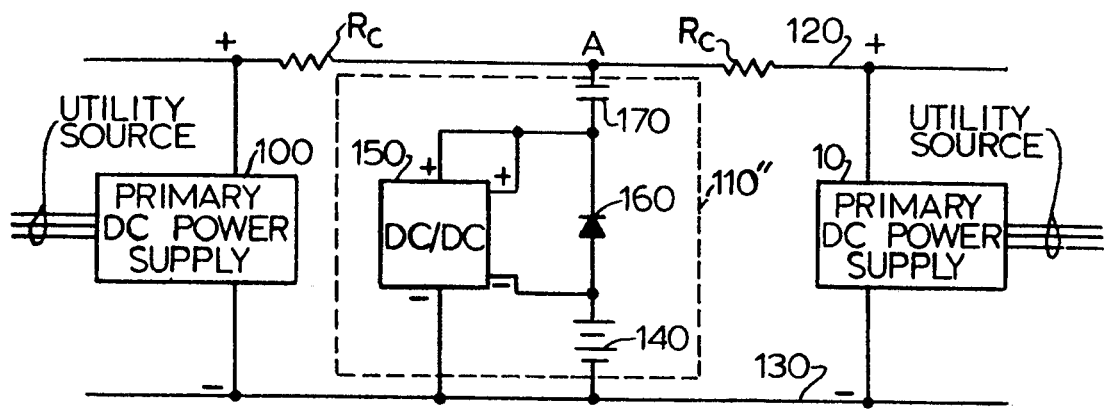
FIG. 4 illustrates a third embodiment of a secondary power supply responsive to surge and continuous peak demands.

A third embodiment of a booster power supply is shown in FIG. 4 and is identified by dashed lines 110". Generally it utilizes power rectifiers and batteries in the same configuration as in the first embodiment; however, the DC/DC converter 150 of FIG. 4 is assumed to be constructed so as to be capable of bi-directional current flow. As an example, this could be accomplished by two "back-to-back" units or by synchronous switching of high voltage and low voltage devices. During continuous peak demand, the secondary voltage of the DC/DC converter 150 is increased to induce battery current to flow into the traction system. When surges occur, the DC/DC converter 150 secondary voltage collapses (current limits) and the surge is carried through diode 160.

With continuing and more specific reference to FIG. 4, in order to allow battery bank 140 to operate more effectively during continuous peak demand periods, converter 150 includes means to enable bi-directional current flow. During normal operation, converter 150 is capable of charging battery bank 140, for which operation the negative output terminal of converter 150 is connected to the positive terminal of battery bank 140. During such a condition, the voltage ratio of converter 150 is set so that when the low voltage terminal voltage is added to the voltage of battery bank 140, the resulting total voltage is lower than the potential of positive feeding line 120 as measured at point A; thus allowing current flow from the distribution line to battery bank 140 and providing a current flow into the feeding line from the high voltage terminals. During continuous peak demand, the output voltage of converter 150 is increased, so that the added voltages of battery bank 140 and the output of converter 150 is higher than the potential of positive feeding line 120 as measured at point A, thereby inducing current flow into the distribution line. This is the condition demonstrated in FIG. 4. During surge demand, when the line voltage drops below the voltage of battery bank 140, the output voltage of converter 150 collapses (current limits) and surge current flows from battery bank 140 through diode 160.

Figure 5:
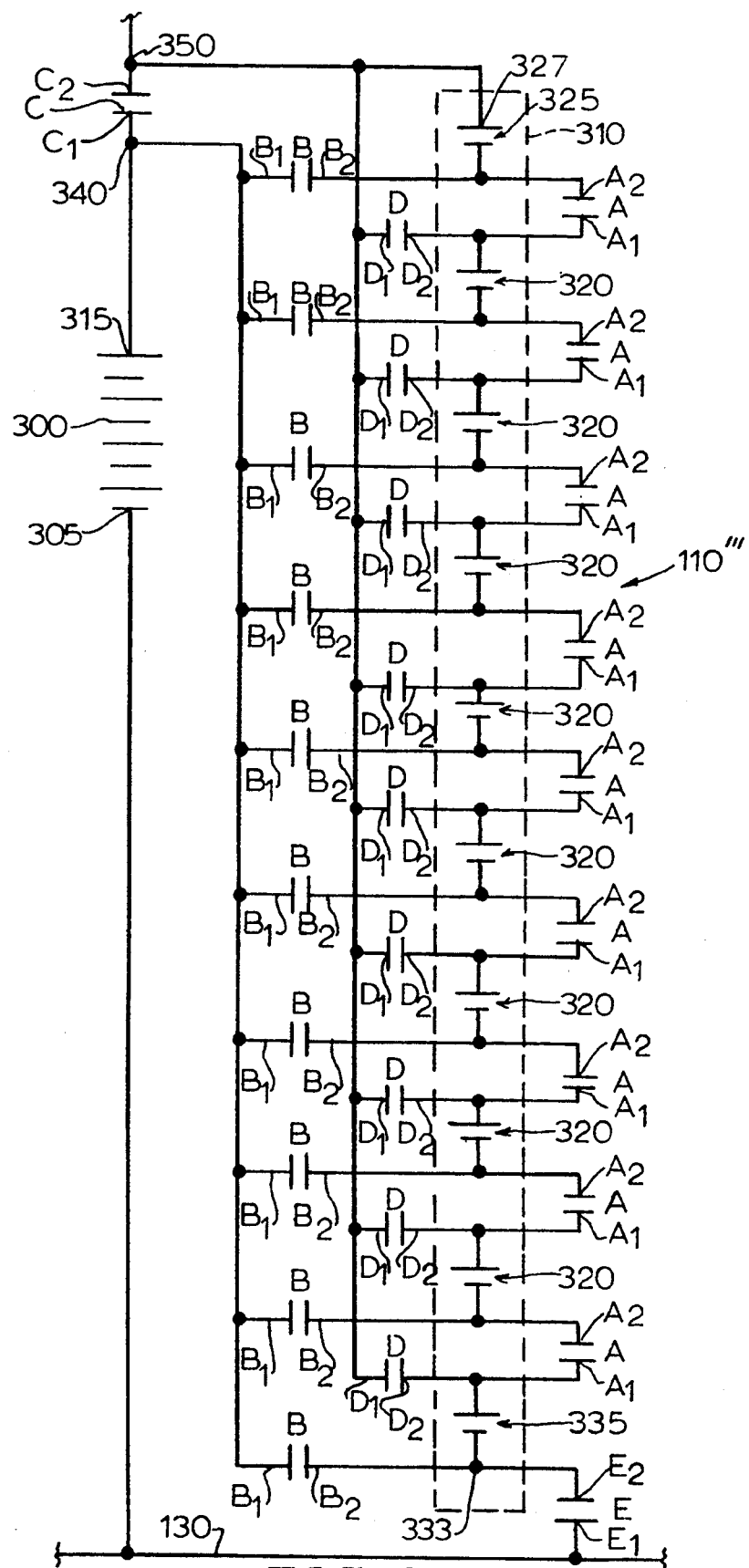
FIG. 5 illustrates in some detail a fourth embodiment of a secondary power supply responsive to surge and continuous peak demands.
Figure 6:
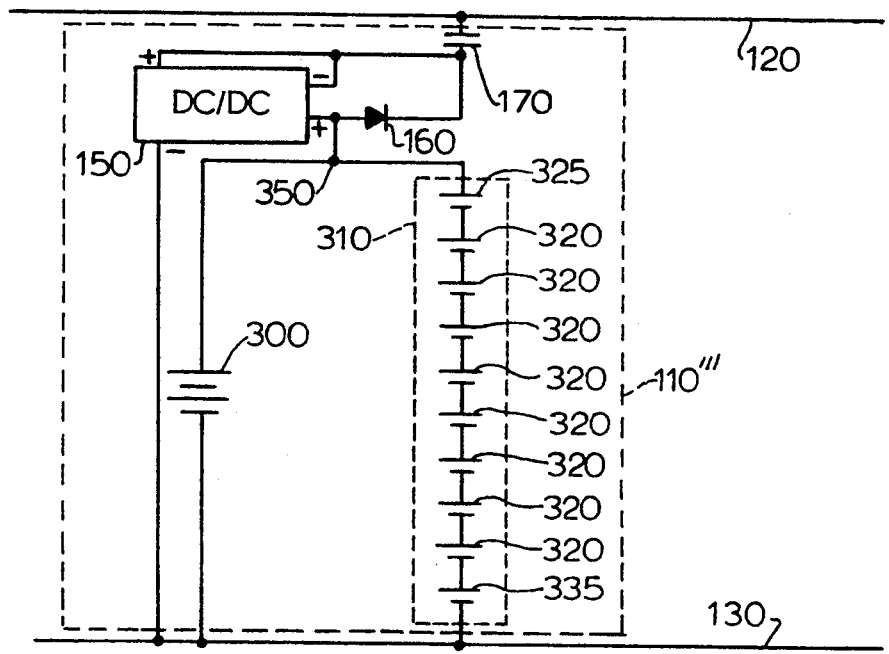
FIG. 6 illustrates more schematically the fourth embodiment secondary power supply in a normal operation mode.
Figure 7:
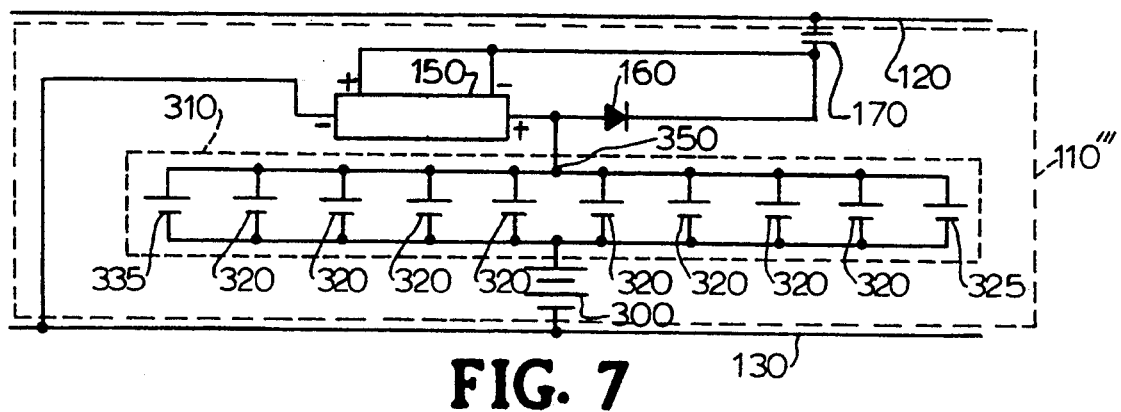
FIG. 7 schematically illustrates the fourth embodiment secondary power supply in a continuous peak demand mode.

A portion of a fourth secondary power supply embodiment 110" is shown in FIG. 5 and is further illustrated in two modes in FIGS. 6 and 7. This embodiment replaces battery bank 140 of the first embodiment with main battery bank 300, supplying 600 volts, and secondary battery bank 310. Secondary battery bank 310 is comprised of battery 325, battery 335, and eight batteries 320, each supplying 60 volts, and with circuitry which can be alternately arranged to collectively provide either 60 volts or 600 volts. Also shown in FIG. 5 are switches marked as "A," "B," "C," "D" and "E." The various combinations of the positions of the switches can be accomplished by utilizing a multi-contact drum switch.

With further reference to FIG. 5, negative terminal 305 of main battery bank 300 is connected to negative feeding line 130, while positive terminal 315 of main battery bank 300 is connected to terminal C1 of switch C. Terminal C2 of switch C is connected through junction 350 to diode 160 and converter 150 (as shown in FIGS. 6 and 7). Terminal B1 of each switch B is connected to terminal C1 of switch C, while terminal B2 of each switch B is connected to a negative terminal of one of the batteries which comprises secondary battery bank 310. Terminal E1 of switch E is connected to negative feeding line 130, and terminal E2 of switch E is connected to negative terminal 333 of battery 335. Positive terminal 327 of battery 325 is connected to terminal C2 of switch C. Battery 325, battery 335, and all batteries 320 are interconnected by switches A. Each terminal A1 of each switch A is connected to a positive terminal of one battery while terminal A2 of the same switch A is connected to the negative terminal of a successive battery so that when all switches A are closed, battery 325, battery 335 and all batteries 320 are connected in series.

During a period of normal demand, switch C, switch E, and all switches A are closed, while all switches B and D are open. The resulting electrical circuit is schematically shown in FIG. 6, which depicts the FIG. 5 arrangement as substituting for battery bank 140 of the first embodiment shown in FIG. 2. In FIG. 6, secondary battery bank 310 is connected in parallel with main battery bank 300, and the resulting arrangement is connected to converter 150 and diode 160 in the same manner as battery bank 140 of the first embodiment depicted in FIG. 2. The combined voltage of all the batteries which comprise secondary battery bank 310 equals the voltage of main battery bank 300.

During a period of continuous peak demand switches A, C, and E are open and switches B and D are closed. The resulting electrical circuit is shown in FIG. 7, which schematically depicts this latter arrangement as a substitute for battery bank 140 of the first embodiment shown in FIG. 2. In FIG. 7 batteries 320, 325, and 335 are all interconnected in parallel so that secondary battery bank 310 supplies a voltage which equals the voltage of main battery bank 300 divided by ten. Secondary battery bank 310 is then connected in series with main battery bank 300 so that the resulting total voltage is the sum of the voltage of main battery bank 300 and the voltage of secondary battery bank 310.

In all embodiments, during energizing, the battery charging current is the same as the secondary current of the DC/DC converter 150. However, the charging voltage is made up of the line voltage added to the charging voltage of the DC/DC converter 150. In all embodiments, during discharge under a surge condition, for example, the supply system impedance is used in combination with the diode or SCR to supply a relatively high current not limited by the capability of the DC/DC converter 150.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. In a transit system having a plurality of utility powered spaced-apart primary DC power supplies connected to a pair of DC feeding lines providing power at the systems traction power voltage including locations within the system associated with high impedance and subjected to normal demand, surge demand, and continuous peak demand power requirements, an improved transit-power supply system comprising:
    (a) a plurality of spaced-apart utility powered primary DC power supplies forming part of the system and connected to its DC feeding lines;
    (b) a vehicular load on said system powered by its DC feeding lines and disposed between selected of said primary DC power supplies and capable of generating at various times dependent on the extent and location of the load with respect to the DC feeding lines, normal demand, surge demand, and continuous peak demand power requirements; and
    (c) a selected number and at least one low impedance secondary DC power supply continuously connected to and powered solely by said DC feeding lines at either or both a location where said DC feeding lines have high impedance and a location where said surge demand occurs, each said secondary power supply having:
        (i) battery means which can be charged and discharged; and
        (ii) regulating means powered solely from said DC feeding lines for charging said battery means solely from said DC feeding lines in the condition of low vehicular load demand at the location of said DC secondary power supply and alternatingly discharging said battery means solely into said DC feeding lines under the condition of relatively high load demand at the location of said secondary DC power supply for assisting said primary DC power supplies in handling both surge demand and continuous peak demand.

2. A method for operating the transit system of claim 1 comprising powering said secondary DC power supply with a controllable primary DC power supply providing a means for controllably absorbing, storing and releasing power by said secondary DC power supply to said primary DC power supplies.

3. In a transit system as claimed in claim 1 wherein at least selected of said primary DC power supplies include means for timing said release of power in response to system demand.

4. In a transit system as claimed in claim 1 wherein at least selected of said primary DC power supplies are controllable thereby providing a means for controlling the release of power from said secondary DC power supply to said primary DC power supplies.

5. In a transit system having a utility powered primary DC power supply connected to a pair of DC feeding lines providing power at the systems traction power voltage including locations within the system associated with high impedance and subjected to normal demand, surge demand, and continuous peak demand power requirements, an improved transit-power supply system comprising:
 (a) a utility powered primary DC power supply forming part of the system connected to its DC feeding lines;
 (b) a vehicular load connected to said DC feeding lines and capable of generating at various times dependent on the extent and location of the load with respect to the DC feeding lines, normal demand, surge demand, and continuous peak demand power requirements;
 (c) a low impedance secondary DC power supply continuously connected to and powered solely by said DC feeding lines at either or both a location where said DC feeding lines have high impedance and a location where said surge demand occurs, comprising:
  (i) battery means which can be charged and discharged and having a terminal voltage whose level is selected to be equal to or to differ from the voltage level of said primary DC power supply by no more than some predetermined fraction of the voltage level of said primary DC power supply;
  (ii) a controllable DC to DC converter having high voltage terminals connected to said primary DC power supply and low voltage terminals establishing a DC voltage level which is some predetermined fraction of the voltage level of said primary DC power supply; and
  (iii) regulating means powered solely from said DC feeding lines for charging said battery means from said DC feeding lines in the condition of low vehicular load demand at the location of said secondary DC power supply and alternatingly discharging said battery means into said DC feeding lines under the condition of relatively high load demand at the location of said secondary DC power supply for assisting said primary DC power supply in handling both surge demand and continuous peak demand;
 (d) circuit means connecting the low voltage terminals of said converter in series arrangement between the terminals of said battery means and the terminals of said secondary power supply; and
 (e) converter control means operatively associated with said converter for controlling the voltage of the low voltage terminals of said converter in correspondence with some selected condition related to a desired load to be imposed on said primary DC power supply, thereby charging or discharging said battery means at voltage and amperage levels corresponding to the selected condition.

6. The transit system of claim 5 wherein said secondary DC power supply includes:
 (a) load control means connected to both said primary DC supply and said battery means and operative to directly connect the battery means to the primary DC supply under a load condition in which the load demand exceeds the current capability of the converter, thereby allowing the battery means to rapidly discharge and supply a relatively high level of current to said primary DC supply during existence of said condition.

7. The transit system of claim 5 wherein said converter is adapted to have the current of said low voltage terminals regulated in a manner allowing reversal of the associated current polarity.

8. The transit system of claim 5 wherein said primary DC power supply comprises a DC power supply for powering a traction load and said selected condition comprises a normal, surge or peak demand condition related to said traction load.

9. The transit system of claim 8 wherein said battery means comprises a plurality of individual batteries at least some of which are selectively connectable in either a series or parallel arrangement with each other enabling the nominal voltage of said battery means to be changed thereby enabling said battery means to provide selected voltage during charging condition and a relatively higher voltage when required to induce a relatively high discharge during peak loads imposed on said primary supply.

10. The transit system of claim 8 wherein said battery means comprises a main battery and a plurality of individual batteries at least some of which are selectively connectable in either a series of parallel arrangement with each other and with said main battery enabling the nominal voltage of said battery means to be changed thereby enabling said battery means to provide a selected terminal voltage during charging condition and a relatively higher terminal voltage when required to provide a discharge during peak loads imposed on said primary supply.

11. The transit system of claim 5 wherein said battery means comprises a plurality of individual batteries at least some of which are selectively connectable in either a series or parallel arrangement with each other enabling the nominal voltage of said battery means to be changed, thereby enabling said battery means to provide selected voltage during charging condition and a relatively higher voltage when required to sustain a relatively high discharge during peak loads imposed on said primary supply.

12. The transit system of claim 5 wherein said load control means comprises a diode.

13. The transit system of claim 5 wherein said load control means comprises a SCR.

14. In a transit system having a utility powered primary DC power supply connected to DC feeding lines for distributing electricity at the systems traction power voltage to electrically powered vehicles, including locations within the system associated with high impedance or surge demand, and subjected to normal demand, surge demand, and continuous peak demand power requirements, an improved transit-power supply system comprising:
 (a) at least one utility powered primary DC power supply forming part of the system;
 (b) a vehicular load on the system powered by its DC feeding lines and capable of generating normal surge, and continuous peak demand power requirements; and
 (c) at least one low impedance secondary DC power supply powered solely by said DC feeding lines and connected to said DC feeding lines at either or both a location where said means for distributing electricity has high impedance and a location where said surge demand occurs, said secondary power supply incorporating:
(i) a battery which can be charged from and discharged to said DC feeding lines; and
(ii) regulating means powered solely from DC feeding lines for charging said battery from said DC feeding lines in the condition of low load demand and discharging said battery into said DC feeding lines under the condition of relatively high demand for assisting said primary DC power supply in handling surge demand and continuous peak demand.

15. In a transit system as claimed in claim 14 wherein said primary DC power supply is controllable in a manner enabling lowering of the output voltage of the primary DC power supply to cause discharge of said battery in order to reduce the load on said primary DC power supply.

* * * * *

UNITED STATES PATENT AND TRADEMARK OFFICE
CERTIFICATE OF CORRECTION

PATENT NO. : 5,382,834
DATED : January 17, 1995
INVENTOR(S) : Thomas A. Young

It is certified that error appears in the above-indentified patent and that said Letters Patent is hereby corrected as shown below:

Column 5, line 57, correct "Of" to read --of--.

Signed and Sealed this

Twenty-fifth Day of April, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,382,834

DATED : January 17, 1995

INVENTOR(S) : Thomas A. Young

It is certified that error appears in the above-identified patent and that said Letters Patent is hereby corrected as shown below:

Column 5, line 42, insert --breaker 170-- after "where".

Signed and Sealed this

Ninth Day of May, 1995

Attest:

BRUCE LEHMAN

Attesting Officer

Commissioner of Patents and Trademarks